(12) United States Patent
Amma et al.

(10) Patent No.: US 9,817,183 B2
(45) Date of Patent: Nov. 14, 2017

(54) MULTICORE FIBER

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Yoshimichi Amma, Sakura (JP); Katsuhiro Takenaga, Sakura (JP); Yusuke Sasaki, Sakura (JP); Kunimasa Saitoh, Sapporo (JP)

(73) Assignees: FUJIKURA LTD., Tokyo (JP); NATIONAL UNIVERSITY CORPORATION HOKKAIDO UNIVERSITY, Sapporo-shi, Hokkaido (JP)

( * ) Notice: Subject to any disclaimer, the term of this patent is extended or adjusted under 35 U.S.C. 154(b) by 0 days.

(21) Appl. No.: 15/501,493

(22) PCT Filed: Feb. 10, 2016

(86) PCT No.: PCT/JP2016/054015
§ 371 (c)(1),
(2) Date: Feb. 3, 2017

(87) PCT Pub. No.: WO2016/129650
PCT Pub. Date: Aug. 18, 2016

(65) Prior Publication Data
US 2017/0235043 A1    Aug. 17, 2017

(30) Foreign Application Priority Data

Feb. 12, 2015    (JP) .................................. 2015-025211

(51) Int. Cl.
*G02B 6/036*    (2006.01)
*G02B 6/02*     (2006.01)

(52) U.S. Cl.
CPC ..... *G02B 6/02042* (2013.01); *G02B 6/02014* (2013.01)

(58) Field of Classification Search
CPC ........................ G02B 6/02014; G02B 6/02042
See application file for complete search history.

(56) References Cited

U.S. PATENT DOCUMENTS

| 8,406,595 B2* | 3/2013 | Hayashi | ............. | G02B 6/02042 385/123 |
| 8,503,847 B2* | 8/2013 | Kokubun | ............ | G02B 6/02042 385/126 |

(Continued)

FOREIGN PATENT DOCUMENTS

| EP | 2 336 813 A1 | 6/2011 |
| EP | 2 682 793 A1 | 1/2014 |

(Continued)

OTHER PUBLICATIONS

International Search Report dated Apr. 26, 2016, issued in counterpart International Application No. PCT/JP2016/054015 (2 pages).

(Continued)

*Primary Examiner* — Rhonda Peace
(74) *Attorney, Agent, or Firm* — Westerman, Hattori, Daniels & Adrian, LLP

(57) ABSTRACT

No core is disposed at the lattice point of a triangular lattice of a first layer LY1. First cores 11a and 11b of the core elements 10a and 10b are disposed at the lattice points of a second layer LY2. A first core 11c of the core element 10c and the second core 21 are alternately disposed at the lattice points of a third layer LY3. In a fourth layer LY4, no core is disposed at six lattice points, and the first cores 11a and 11b of the core elements 10a and 10b are disposed at the other lattice points. The second cores 21 are adjacent to the lattice points of the fourth layer LY4, at which no core is (Continued)

disposed. The effective refractive indexes of the core elements adjacent to each other are different from each other.

11 Claims, 5 Drawing Sheets

(56) References Cited

U.S. PATENT DOCUMENTS

| | | | | |
|---|---|---|---|---|
| 8,965,165 | B2* | 2/2015 | Sasaki | G02B 6/02042 385/126 |
| 9,008,479 | B2* | 4/2015 | Tanigawa | G02B 6/02042 385/126 |
| 9,052,432 | B2* | 6/2015 | Yao | G02B 6/02042 |
| 9,291,768 | B2* | 3/2016 | Ishida | G02B 6/02042 |
| 9,400,351 | B2* | 7/2016 | Takenage | G02B 6/03605 |
| 9,588,284 | B2* | 3/2017 | Sasaki | G02B 6/02042 |
| 2011/0182557 | A1 | 7/2011 | Hayashi | |
| 2011/0243517 | A1 | 10/2011 | Kokubun et al. | |
| 2014/0010507 | A1 | 1/2014 | Sasaki et al. | |
| 2014/0178024 | A1* | 6/2014 | Takenaga | G02B 6/02042 385/126 |

FOREIGN PATENT DOCUMENTS

| | | |
|---|---|---|
| JP | 2011-170336 A | 9/2011 |
| JP | 2012-181282 A | 9/2012 |
| JP | 5168702 B2 | 3/2013 |
| JP | 2014-164269 A | 9/2014 |
| WO | 2012/118132 A1 | 9/2012 |

OTHER PUBLICATIONS

Koshiba et al., "Heterogenous multi-core fibers: proposal and design principle", IEICE Electronics Express, vol. 6, No. 2, pp. 98-103, Jan. 25, 2009 (cited in ISR).

* cited by examiner

MULTICORE FIBER

TECHNICAL FIELD

The present invention relates to a multicore fiber that is preferable to the case in which a cutoff wavelength is prevented from being a long wavelength, while reducing crosstalk.

BACKGROUND ART

Presently, an optical fiber for use in commonly popular optical fiber communication systems has a structure in which the outer circumferential surface of one core is surrounded by a cladding. Optical signals propagate through the inside of the core to transmit information. In these years, with a widespread use of optical fiber communication systems, the volume of information to be transmitted is dramatically increased. With an increase in the volume of information to be transmitted, in an optical fiber communication system, a large number of optical fibers ranging from a few tens to a few hundreds optical fibers are used to conduct large-capacity long distance optical communications.

In such an optical fiber communication system, a method is known in which with the use of a multicore fiber having one cladding surrounding the outer circumferential surfaces of a plurality of cores, light beams propagating through the cores transmit a plurality of signals.

Patent Literature 1 below describes an example of a multicore fiber. In this multicore fiber, one core is disposed in the center of a cladding, and six cores are disposed around the core disposed in the center. This disposition is a structure in which cores can be closely packed. Thus, many cores can be disposed to the outer diameter of a specific cladding. In the multicore fiber described in Patent Literature 1, in order to reduce the crosstalk between light beams propagating through the cores, the effective refractive indexes of the cores adjacent to each other are set different from each other.

However, there is a demand to further reduce crosstalk than in the multicore fiber described in Patent Literature 1 in which the effective refractive indexes of the cores adjacent to each other are changed. Therefore, a multicore fiber is known in which a low refractive index layer having a refractive index lower than the refractive index of a cladding is disposed to surround the outer circumferential surfaces of cores, further preventing crosstalk. When this multicore fiber is viewed from the viewpoint of the refractive index, the low refractive index layer has a trench shape. Thus, the multicore fiber is referred to as a trench-assisted multicore fiber, and the configuration from the core to the low refractive index layer is referred to as a core element.

However, in this multicore fiber, when the core elements are disposed to surround a certain core or core element, it is difficult to release higher mode light beams in a light beam propagating through this certain core or core element, causing a cutoff wavelength to become a long wavelength. Therefore, like a multicore fiber described in Patent Literature 2 below, a configuration is known in which in a plurality of core elements surrounding a certain core or core element, a part of the core elements is formed in a simple core by removing a trench layer from the core element. According to such a multicore fiber, a cutoff wavelength can be prevented from being a long wavelength, while reducing crosstalk.

[Patent Literature 1] JP2011-170336 A

[Patent Literature 2] International Publication No. WO 12/118132

SUMMARY OF INVENTION

However, in the multicore fibers described in Patent Literatures 1 and 2 above, when it is desired to dispose 30 cores or more, a tendency is observed, in which crosstalk is increased, or in which a cutoff wavelength becomes a long wavelength.

Therefore, an object of the present invention is to provide a multicore fiber that can increase the number of cores to be disposed, while reducing crosstalk and preventing a cutoff wavelength from being a long wavelength.

In order to achieve the object, a multicore fiber according to the present invention includes: a plurality of core elements having a first core, an inner cladding surrounding an outer circumferential surface of the first core, and a low refractive index layer having a refractive index lower than a refractive index of the inner cladding, the low refractive index layer surrounding the inner cladding; a plurality of second cores; and an outer cladding having a refractive index lower than a refractive index of the first core and a refractive index of the second core and higher than the refractive index of the low refractive index layer, the outer cladding surrounding the core elements and the second cores. The multicore fiber has characteristics below.

That is, an effective refractive index of the core element is different from an effective refractive index of the second core, and the plurality of core elements is enabled to be sorted into at least three types of core elements whose effective refractive indexes are different from each other.

In a triangular lattice based on apexes of a regular hexagon surrounding a center of the outer cladding, when a lattice point surrounded by the apexes is a first layer, a layer formed of lattice points located on the apexes is a second layer, a layer formed of lattice points disposed adjacently around an outer side of the second layer is a third layer, and a layer formed of lattice points disposed adjacently around an outer side of the third layer is a fourth layer, no core is disposed at the lattice point of the first layer, the first core of the core element is disposed at the lattice points of the second layer, the first core of the core element and the second core are alternately disposed at the lattice points of the third layer, and in the fourth layer, no core is disposed at six lattice points and the first core of the core element is disposed at the other lattice points. The second cores are adjacent to the lattice points of the fourth layer, at which no core is disposed. Effective refractive indexes of the core elements adjacent to each other are different from each other.

In accordance to the multicore fiber according to the present invention having the characteristics, 30 cores are disposed from the second layer to the fourth layer. Thus, in the multicore fiber according to the present invention, 30 cores or more can be disposed.

Each of the core elements disposed on the second layer is adjacent to the lattice point on the first layer, at which no core is disposed, and adjacent to one or two second cores disposed on the third layer. Thus, a higher mode light beam can be easily released from any of the core elements disposed on the second layer. Each of the second cores disposed on the third layer is adjacent to the lattice points of the fourth layer, at which no core is disposed. Accordingly, a higher mode light beam can be easily released from the second cores. Each of the core elements disposed on the third layer is adjacent to two of the second cores disposed on the third layer. Thus, a higher mode light beam can be easily released from the core elements disposed on the third layer. Each of the core elements disposed on the fourth layer is adjacent to the lattice points of the fourth layer, at which no core is disposed. Consequently, a higher mode light beam can be easily released from the core elements disposed on the fourth layer. Accordingly, the cutoff wavelengths of the cores can be prevented from being a long wavelength.

In all of the first cores and the second cores, the low refractive index layer is disposed on the cores adjacent to each other. Moreover, the effective refractive indexes of the core elements adjacent to each other or the effective refractive indexes of the core element and the second core adjacent to each other are different from each other. Thus, the crosstalk between the cores adjacent to each other and the core element and the crosstalk between the core elements adjacent to each other can be reduced.

The core elements and the second cores are thus disposed, allowing an increase in the number of cores to be disposed, while reducing crosstalk and preventing a cutoff wavelength from being a long wavelength.

The second core is preferably disposed on each apex of a hexagon of the third layer formed by connecting lattice points adjacent to each other.

In the case in which the second core is located on the apexes of the hexagon of the third layer as described above, the core element is always located between the second cores. Thus, the crosstalk between the second cores having no low refractive index layer can be more appropriately reduced.

All of the core elements are adjacent to at least one lattice point, at which no core is disposed, and at least one second core. That is, all of the core elements are adjacent to at least two lattice points, at which a higher mode light beam is easily released. Meanwhile, all of the second cores are adjacent to one lattice point, at which no core is disposed, and surrounded by five core elements. That is, all of the second cores are adjacent to only one lattice point, at which a higher mode light beam is easily released. When the influence of the adjacent core elements and the adjacent cores is ignored, a higher mode light beam is more easily released from the second core, which is not surrounded by the low refractive index layer, than from the core element having the low refractive index layer. Thus, according to this configuration, the balance of the ease of releasing a higher mode light beam can be achieved between the core element and the second core.

As described above, in the case in which the second core is disposed on each apex of the hexagon of the third layer, the lattice points of the fourth layer, at which no core is disposed, may be located on apexes of a hexagon of the fourth layer formed by connecting lattice points adjacent to each other.

No core is disposed on the apexes of the hexagon of the fourth layer, allowing the distance from the center of the cladding to the core of the fourth layer to be decreased more as compared with the case in which a core is disposed on these apexes. Thus, in the case of taking into account of the disposition of the cores to the fourth layer, the outer diameter of the cladding can be decreased.

As described above, in the case in which the second core is disposed on each apex of the hexagon of the third layer, the lattice points of the fourth layer, at which no core is disposed, may be located on sides of a hexagon of the fourth layer formed by connecting lattice points adjacent to each other.

With this disposition of the cores, the positions of the lattice points of the fourth layer, at which no core is disposed, or the positions of the core elements to be disposed are different at both ends of the multicore fiber. Thus, even in the case in which no markers to identify the cores are provided, the type of the core can be identified.

Alternatively, the second core is preferably disposed on sides of a hexagon of the third layer formed by connecting lattice points adjacent to each other.

With this disposition of the cores, the positions of the lattice points of the fourth layer, at which no core is disposed, or the positions of the core elements to be disposed are different at both ends of the multicore fiber. Thus, even in the case in which no markers to identify the cores are provided, the type of the core can be identified.

Preferably, an outer diameter of the outer cladding is 230 μm or less, and a distance from the lattice point to the lattice point is 30 μm or less.

The distance from the lattice point to the lattice point is none other than the core pitch of the cores adjacent to each other. This core pitch is defined, and the outer diameter of the cladding is defined. Thus, even in the case in which the outer circumferential surface of the cladding is covered with a resin layer, excess losses caused by the covering can be reduced, while maintaining the mechanical strength of the multicore fiber.

A level of crosstalk between the core elements adjacent to each other and a level of crosstalk between the core element and the second core adjacent to each other preferably reach a peak at a bending radius smaller than a radius of 100 mm.

Commonly, the optical fiber is used at a bending radius of 100 mm or more. Thus, with the configuration described above, crosstalk does not reach a peak in typical specifications. Accordingly, crosstalk can be reduced.

When a light beam at a wavelength of 1,550 nm propagates through the core element and the second core, a level of crosstalk between the core elements adjacent to each other and a level of crosstalk between the core element and the second core adjacent to each other are preferably −37 dB or less per 100 km.

Crosstalk is set to have such a value, allowing the multicore fiber to be sufficiently used as a communication optical fiber.

The core element and the second core may transmit a light beam at a wavelength of 1,530 nm or more in a single mode.

An effective refractive index difference between the core elements adjacent to each other and an effective refractive index difference between the core element and the second core adjacent to each other are preferably 0.0005 or more.

The effective refractive index difference between the core elements adjacent to each other and the effective refractive index difference between the core element and the second core adjacent to each other have the effective refractive index differences described above. Thus, crosstalk can be more appropriately reduced.

An effective cross sectional area of the core element and an effective cross sectional area of the second core are preferably equal.

The effective cross sectional areas of the core elements and the second core are equal. Thus, fluctuations in the optical signal-to-noise ratio between the cores or a splicing loss of the cores can be decreased.

As described above, according to the present invention, there is provided a multicore fiber that can increase the number of cores to be disposed, while reducing crosstalk and preventing a cutoff wavelength from being a long wavelength.

DESCRIPTION OF EMBODIMENTS

Figure 1:
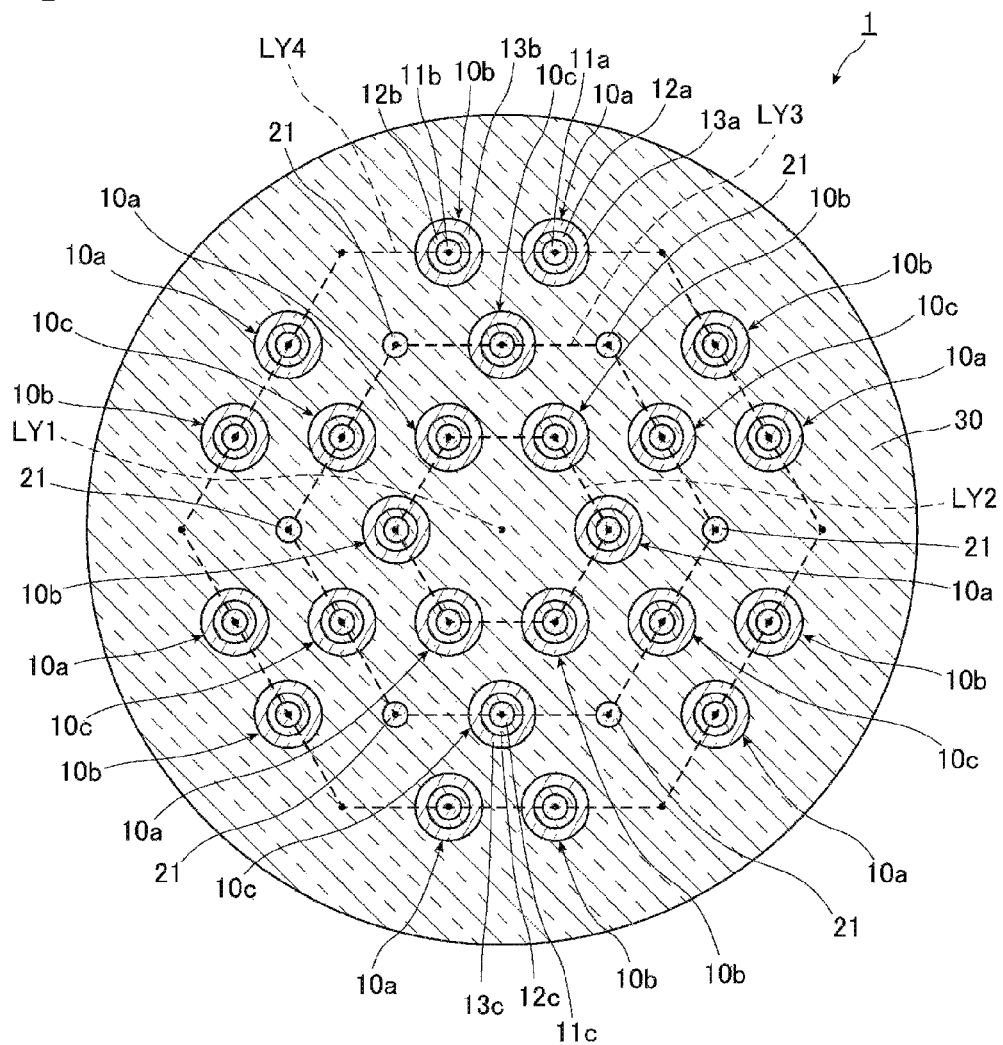
FIG. 1 is a cross sectional view of a multicore fiber according to a first embodiment of the present invention perpendicular to longitudinal direction.

In the following, preferred embodiments of a multicore fiber according to the present invention will be described in detail with reference to the drawings. Note that, for easy understanding, scales in the drawings are sometimes different from scales described in the following description.

First Embodiment

FIG. 1 is a diagram of the structure of a multicore fiber according to the embodiment in a cross section perpendicular to the longitudinal direction. As illustrated in FIG. 1, a multicore fiber 1 according to the embodiment includes a plurality of core elements 10a, 10b, and 10c, a plurality of second cores 21, and an outer cladding 30 surrounding the core elements 10a, 10b, and 10c.

The core element 10a includes a first core 11a, an inner cladding 12a surrounding the outer circumferential surface of the first core 11a with no gap, and a low refractive index layer 13a surrounding the outer circumferential surface of the inner cladding 12a with no gap and having its outer circumferential surface surrounded by the outer cladding 30 with no gap. The core element 10b includes a first core 11b, an inner cladding 12b surrounding the outer circumferential surface of the first core 11b with no gap, and a low refractive index layer 13b surrounding the outer circumferential surface of the inner cladding 12b with no gap and having its outer circumferential surface surrounded by the outer cladding 30 with no gap. The core element 10c includes a first core 11c, an inner cladding 12c surrounding the outer circumferential surface of the first core 11c with no gap, and a low refractive index layer 13c surrounding the outer circumferential surface of the inner cladding 12c with no gap and having its outer circumferential surface surrounded by the outer cladding 30 with no gap. The second cores 21 are surrounded by the outer cladding 30 with no gap. Note that, in the following description, in the case of simply referring a core, this sometimes means both of the first cores 11a to 11c and the second core 21.

As illustrated in FIG. 1, three core elements 10a and three core elements 10b are disposed in such a manner that they surround the center axis of the outer cladding 30. More specifically, the core elements 10a and the core elements 10b are alternately disposed, and the first cores 11a of the three core elements 10a and the first cores 11b of the three core elements 10b are located at the apexes of a regular hexagon.

Here, based on this regular hexagon, triangular lattices are drawn, i.e. triangular lattices are drawn in which the apexes of the regular hexagon are lattice points. In this case, a triangle forming a triangular lattice is a regular triangle, and the side of the regular hexagon is the side of the triangle. Note that, in FIG. 1, the lattice points of the triangular lattices are expressed by points. When the triangular lattices are drawn as described above, as illustrated in FIG. 1, the first cores 11a to 11c of the core elements 10a to 10c and the second cores 21 are disposed at lattice points.

When a lattice point surrounded by this regular hexagon is a first layer LY1, one lattice point is located at the lattice point located on the first layer LY1. In the embodiment, this lattice point is located on the center axis of the outer cladding 30. However, the lattice point may be displaced from the center axis of the outer cladding 30 more or less. As illustrated in FIG. 1, the outer cladding 30 is located at the lattice point located on the first layer LY1, at which no core is disposed.

When the first layer LY1 is defined as described above, a layer formed of the apexes of the regular hexagon is a second layer LY2. At the lattice points of the second layer LY2, the first core 11a of the core element 10a and the first core 11b of the core element 10b are alternately disposed.

When a layer formed of lattice points disposed adjacently around the outer side of the lattice points of the second layer LY2 is a third layer LY3, the first core 11c of the core element 10c and the second core 21 are alternately disposed at the lattice points of the third layer LY3. In the embodiment, the second core 21 is disposed on each apex of a hexagon formed by connecting the lattice points adjacent to each other of the third layer LY3, and the first core 11c is disposed at the lattice point on the sides of a hexagon of the third layer LY3.

A layer formed of lattice points disposed adjacently around the outer side of the lattice points of the third layer LY3 is a fourth layer LY4. In the fourth layer LY4, no core is disposed at six lattice points of the fourth layer LY4, the first cores 11a of six core elements 10a and the first cores 11b of six core elements 10b are disposed at 12 lattice points of the fourth layer LY4, and each second core 21 disposed on the third layer LY3 is adjacent to the lattice points, at which no core is disposed, of the fourth layer LY4. In the embodiment, the lattice points of the fourth layer LY4, at which no core is disposed, are the lattice points located at the apexes of a hexagon formed by connecting the lattice points adjacent to each other of the fourth layer LY4. Two lattice points are each located on the sides of the fourth layer LY4. At the lattice points located on each side, the first core 11a of one core element 10a and the first core 11b of one core element 10b are disposed.

In the multicore fiber 1 according to the embodiment, at the lattice points disposed adjacently around the outer side of the lattice points of the fourth layer LY4, no core is disposed. As described above, the core elements 10a, 10b, and 10c and the second core 21 are disposed in such a manner that the core elements 10a are not disposed adjacent to each other, the core elements 10b are not disposed adjacent to each other, the core elements 10c are not disposed adjacent to each other, and the second cores 21 are not disposed adjacent to each other. As described above, the core elements 10a, 10b, and 10c, and the second core 21 are disposed. Thus, in the multicore fiber 1 according to the embodiment, 30 cores are disposed.

Figure 2:
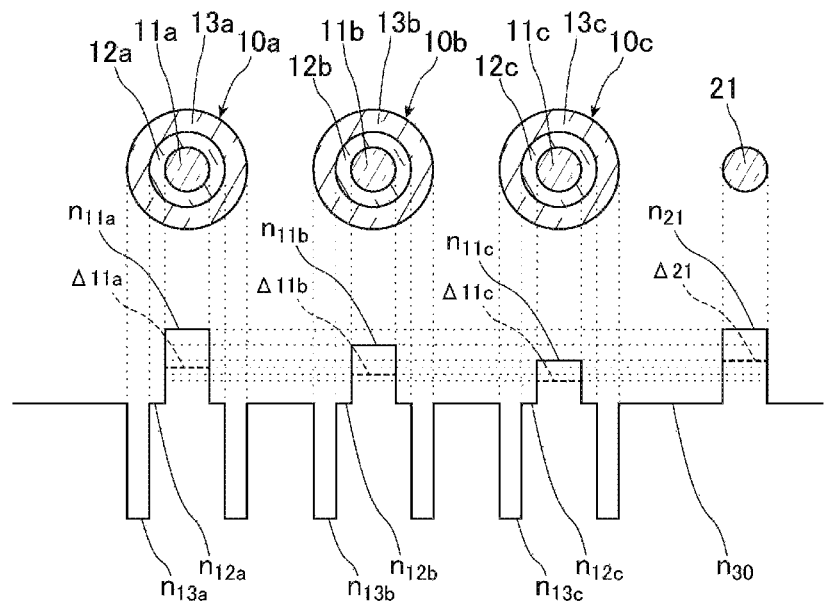
FIG. 2 is a diagram of the refractive indexes and effective refractive indexes of cores of the multicore fiber illustrated in FIG. 1.

FIG. 2 is a diagram of the refractive indexes and effective refractive indexes of the core elements 10a to 10c and the second core of the multicore fiber 1 illustrated in FIG. 1. In FIG. 2, the refractive index is depicted by a solid line in the case in which the core element 10a, the core element 10b, the core element 10c, and the second core 21 are arranged and the outer cladding 30 fills the space between the core elements 10a to 10c and the second core 21. In FIG. 2, the effective refractive indexes of the core elements 10a to 10c and the second core 21 are depicted by broken lines.

In the embodiment, the diameters of the first cores 11a, 11b, and 11c of the core elements 10a, 10b, and 10c are set different from the diameter of the second core 21. For example, the radius of the first core 11a is 4.76 µm, the radius of the first core 11b is 4.62 µm, the radius of the first core 11c is 4.47 µm, and the radius of the second core 21 is 4.68 µm. In the embodiment, the outer diameters of the inner claddings 12a to 12c of the core elements 10a to 10c are set different from each other. For example, the radius (the radius of the outer circumferential surface) of the inner cladding 12a is 8.09 µm, the radius of the inner cladding 12b is 7.85 µm, and the radius of the inner cladding 12c is 7.60 µm. In the case in which the radii of the inner claddings 12a to 12c and the radii of the first cores 11a to 11c are the radii as described above, the ratio of the radius of the first core 11a to the radius of the inner cladding 12a, the ratio of the radius of the first core 11b to the radius of the inner cladding 12b, and the ratio of the radius of the first core 11c to the radius of the inner cladding 12c have almost the same values. In the embodiment, the thicknesses of the low refractive index layers 13a to 13c of the core elements 10a to 10c are set different from each other. For example, the thickness of the low refractive index layer 13a is 4.76 µm, the thickness of the low refractive index layer 13b is 4.62 µm, and the thickness of the low refractive index layer 13c is 5.36 µm. In this case, when the radii of the first cores 11a to 11c are the radii described above, the ratio of the radius of the low refractive index layer 13a to the radius of the first core 11a is 1.0, the ratio of the radius of the low refractive index layer 13b to the radius of the first core 11b is 1.0, and the ratio of the radius of the low refractive index layer 13c to the radius of the first core 11c is 1.2.

An outer diameter R of the outer cladding 30 is 156 µm or more and 230 µm or less, for example. The distance from the lattice point to the lattice point, i.e. an inter-center pitch $\Lambda$ of the cores adjacent to each other is 20 µm or more and 34 µm or less, for example. The distance from the first cores 11a and 11b disposed on the fourth layer LY4 to the outer circumferential surface of the outer cladding 30 is 25 µm or more and 45 µm or less, for example.

A refractive index $n_{11a}$ of the first core 11a of the core element 10a is higher than a refractive index $n_{12a}$ of the inner cladding 12a. A refractive index $n_{13a}$ of the low refractive index layer 13a is lower than the refractive index $n_{12a}$ of the inner cladding 12a and a refractive index $n_{30}$ of the outer cladding 30. Similarly, a refractive index $n_{11b}$ of the first core 11b of the core element 10b is higher than a refractive index $n_{12b}$ of the inner cladding 12b. A refractive index $n_{13b}$ of the low refractive index layer 13b is lower than the refractive index $n_{12b}$ of the inner cladding 12b and the refractive index $n_{30}$ of the outer cladding 30. A refractive index $n_{11c}$ of the first core 11c of the core element 10c is higher than a refractive index $n_{12c}$ of the inner cladding 12c. A refractive index $n_{13c}$ of the low refractive index layer 13c is lower than the refractive index $n_{12c}$ of the inner cladding 12c and the refractive index $n_{30}$ of the outer cladding 30. Note that, in the embodiment, the refractive indexes $n_{12a}$ to $n_{12c}$ of the inner claddings 12a, 12b, and 12c are equal to each other, and are the same as the refractive index $n_{30}$ of the outer cladding 30. A refractive index $n_{21}$ of the second core 21 is higher than the refractive index $n_{30}$ of the outer cladding 30.

As described above, in the case in which the core elements 10a to 10c are viewed from the viewpoint of the refractive index, the low refractive index layers 13a to 13c have a groove shape, and the core elements 10a to 10c have a trench structure. Such a trench structure is formed, allowing a reduction in losses in light beams propagating through the first cores 11a to 11c of the multicore fiber 1.

The multicore fiber 1 has the refractive indexes described above. Thus, for example, the outer cladding 30 and the inner claddings 12a to 12c are formed of silica doped with no dopant. The first cores 11a to 11c and the second core 21 are formed of silica doped with a dopant that increases the refractive index, such as germanium. The low refractive index layers 13a to 13c are formed of silica doped with a dopant that decreases the refractive index, such as fluorine. As described above, in the case in which the first cores 11a to 11c and the second core 21 have different refractive indexes, the amount of a dopant added to the first cores 11a to 11c and the second core 21 is appropriately changed.

Note that, unlike the description above, the refractive indexes of the inner claddings 12a to 12c may be set different from the refractive index of the outer cladding 30. In this case, as long as the effective refractive indexes of the core elements 10a to 10c are different from each other, the refractive indexes of the inner claddings 12a to 12c may be the same or may be different from each other. In the case in which the refractive indexes of the inner claddings 12a to 12c are different from the refractive index of the outer cladding 30, the inner claddings 12a to 12c are doped with a necessary dopant. Alternatively, the outer cladding 30 may be doped with a dopant appropriately.

In the embodiment, the refractive indexes $n_{11a}$, $n_{11b}$, $n_{11c}$ and $n_{21}$ of the first cores 11a, 11b, and 11c and the second core 21 are different from each other. For example, a relative refractive index difference $\Delta_{11a}$ of the first core 11a to the outer cladding 30 is 0.338%. A relative refractive index difference $\Delta_{11b}$ of the first core 11b to the outer cladding 30 is 0.305%. A relative refractive index difference $\Delta_{11c}$ of the first core 11c to the outer cladding 30 is 0.273%. A relative refractive index difference $\Delta_{21}$ of the second core 21 to the outer cladding 30 is 0.388%.

In the embodiment, the refractive indexes of the low refractive index layers 13a, 13b, and 13c are equal to each other. For example, the relative refractive index differences of the low refractive index layers 13a, 13b, and 13c to the outer cladding 30 are −0.7%.

The diameters and refractive indexes of the members configuring the multicore fiber 1 are defined as described above. Thus, the effective refractive indexes of the core elements 10a to 10c and the second core 21 are different from each other. For example, in the case in which the diameters and refractive indexes of the members configuring the multicore fiber 1 are defined as described in the exemplifications above, in a light beam at a wavelength of 1,550 nm in the fundamental mode, the effective refractive index of the core element 10a is 1.45241450, the effective refractive index of the core element 10b is 1.45190751, and the effective refractive index of the core element 10c is 1.45141253. Note that, in FIG. 2, the effective refractive indexes of the core elements 10a to 10c and the second core are depicted by broken lines in the states in the exemplifications described above. As described above, from the viewpoint of the effective refractive indexes of the core elements 10a to 10c, the core elements 10a to 10c can be sorted into three types. The effective refractive index of the second core 21 is 1.45304244. As described above, the core elements 10a are not disposed adjacent to each other, the core elements 10b are not disposed adjacent to each other, the core elements 10c are not disposed adjacent to each other, and the second cores 21 are not disposed adjacent to each other. Thus, in the multicore fiber 1, the effective refractive indexes of the core elements adjacent to each other are different from each other, and the effective refractive indexes of the core element and the second core adjacent to each other are different from each other.

In the case in which the diameters and refractive indexes of the members configuring the multicore fiber 1 are defined as described in the exemplifications above, in a light beam at a wavelength of 1,550 nm in the fundamental mode, the effective cross sectional area of the core element 10a is 80.2 μm², the effective cross sectional area of the core element 10b is 80.3 μm², the effective cross sectional area of the core element 10c is 80.2 μm², and the effective cross sectional area of the second core 21 is 80.0 μm². Thus, the effective cross sectional areas of the core elements 10a to 10c and the second core 21 are almost equal.

In the case in which the diameters and refractive indexes of the members configuring the multicore fiber 1 are defined as described in the exemplifications above, to an LP11 mode light beam, the cutoff wavelength of the core element 10a is 1.53 μm, the cutoff wavelength of the core element 10b is 1.35 μm, the cutoff wavelength of the core element 10c is 1.39 μm, and the cutoff wavelength of the second core 21 is 1.53 μm.

Here, Table 1 shows the parameters below sorted by the core elements 10a to 10c and the second core: a radius $r_1$ of the first cores 11a to 11c and the second core 21; a relative refractive index difference $\Delta_1$ to the outer cladding 30; a relative refractive index difference $\Delta_t$ of the low refractive index layers 13a to 13c to the outer cladding 30; a ratio $r_2/r_1$ of the radius $r_1$ of the first cores 11a to 11c to a radius $r_2$ of the inner claddings 12a to 12c; a ratio $W/r_1$ of a thickness W of the low refractive index layers 13a to 13c to the radius $r_1$ of the first cores 11a to 11c; an effective area $A_{eff}$ of the core elements 10a to 10c and the second core 21 in a light beam at a wavelength of 1,550 nm in the fundamental mode; and a cutoff wavelength $\lambda_{cc}$ to the LP11 mode light beam.

reaches a peak is given by Equation (1) below. In Equation (1) below, $n_{eff1}$ is the effective refractive index of one of the cores adjacent to each other, $n_{eff2}$ is the effective refractive index of the other of the cores adjacent to each other, and $\Delta n_{eff}$ is the effective refractive index difference between the cores adjacent to each other. $\Lambda$ is the inter-center pitch (the core pitch) between the cores adjacent to each other, which is matched with the lattice spacing between triangular lattices in the case of the multicore fiber 1 according to the embodiment.

$$R_{pk} = \frac{n_{eff1}}{|n_{eff1} - n_{eff2}|}\Lambda = \frac{n_{eff1}}{\Delta n_{eff}}\Lambda \quad (1)$$

Commonly, optical fibers are used in a cable form. It is known that in the cable, the minimum bending radius applied to an optical fiber is a few hundred micrometers. Thus, it is thought that when the bending radius $R_{pk}$ of the optical fiber where crosstalk reaches a peak is smaller than the minimum bending radius, crosstalk can be sufficiently reduced under a typical use environment of optical fibers. Therefore, the effective refractive index difference $\Delta n_{eff}$ between the cores adjacent to each other only has to be set to the core pitch $\Lambda$ ranging from 20 μm to 34 μm in such a manner that the bending radius $R_{pk}$ where the crosstalk of the multicore fiber 1 according to the embodiment is the maximum is smaller than 100 mm. Moreover, it is thought that when the bending radius $R_{pk}$ is 70 mm or less with a margin 30% or more of a minimum bending radius of 100 mm of the optical fiber, crosstalk can be further reduced under a typical use environment of optical fibers.

For example, in the multicore fiber 1, in the case in which the parameters are defined as in Table 1 and the core pitch

TABLE 1

|  | $r_1$ [μm] | $\Delta_1$ [%] | $\Delta_t$ [%] | $r_2/r_1$ | $W/r_1$ | $n_{eff}$ of LP01 | $A_{eff}$ of LP01 [μm²] | $\lambda_{cc}$ of LP11 [μm] |
|---|---|---|---|---|---|---|---|---|
| Core element10a | 4.76 | 0.338 | −0.7 | 1.7 | 1.0 | 1.45241450 | 80.2 | 1.53 |
| Core element10b | 4.62 | 0.305 | −0.7 | 1.7 | 1.0 | 1.45190751 | 80.3 | 1.35 |
| Core element10c | 4.47 | 0.273 | −0.7 | 1.7 | 1.2 | 1.45141253 | 80.2 | 1.39 |
| Second core 21 | 4.68 | 0.388 | — | — | — | 1.45304244 | 80.0 | 1.53 |

In the case in which the parameters of the multicore fiber 1 are defined as described above, the outer diameter of the outer cladding 30 is 228 μm, for example. These parameters are defined, for example, allowing the core elements 10a to 10c and the second core 21 to transmit light beams in a wavelength range of a wavelength of 1,530 nm or more in a single mode.

Next, the relationship will be described between the effective refractive index difference and the bending radius of the cores adjacent to each other, i.e. the effective refractive index difference between the core elements adjacent to each other or the effective refractive index difference between the core element and the second core 21 adjacent to each other, and the bending radius of the multicore fiber 1 where crosstalk reaches a peak between the core elements adjacent to each other or between the core element and the second core 21 adjacent to each other.

Commonly in the multicore fiber, a bending radius $R_{pk}$ where the crosstalk between the cores adjacent to each other $\Lambda$ is 30 μm, the effective refractive index difference $\Delta n_{eff}$ between the core elements adjacent to each other or the effective refractive index difference $\Delta n_{eff}$ between the core element and the second core 21 adjacent to each other and the bending radius $R_{pk}$ where crosstalk is the maximum are as described in Table 2 below.

TABLE 2

|  | $\Delta n_{eff}$ | $R_{PK}$ [mm] |
|---|---|---|
| Core element 10a to core element 10b | 0.0005 | 86 |
| Core element 10a to core element 10c | 0.0010 | 43 |
| Core element 10a to second core 21 | 0.0006 | 69 |
| Core element 10b to core element 10c | 0.0005 | 88 |
| Core element 10a to second core 21 | 0.0011 | 38 |
| Core element 10c to second core 21 | 0.0016 | 27 |

As shown in Table 2, the parameters are defined. Thus, the effective refractive index difference $\Delta n_{eff}$ between the core elements adjacent to each other or the effective refractive index difference $\Delta n_{\mathit{eff}}$ between the core element and the second core 21 adjacent to each other is 0.0005 or more, and the bending radius $R_{pk}$ where crosstalk is the maximum is smaller than 100 mm.

As described above, in accordance with the multicore fiber 1 according to the embodiment, at least 30 cores can be disposed.

Each of the core elements 10a and 10b disposed on the second layer LY2 is adjacent to the lattice point on the first layer LY1, at which no core is disposed, and adjacent to one of the second cores 21 disposed on the third layer LY3. Thus, a higher mode light beam can be easily released from any of the core elements 10a and 10b disposed on the second layer LY2. Each of the second cores 21 disposed on the third layer LY3 is adjacent to the lattice points of the fourth layer LY4, at which no core is disposed. Thus, a higher mode light beam can also be easily released from any of the second cores 21. Each of the core elements 10c disposed on the third layer is adjacent to two of the second cores 21 disposed on the third layer LY3. Thus, a higher mode light beam can be easily released from each of the core elements 10c disposed on the third layer LY3. Each of the core elements 10a and 10b disposed on the fourth layer LY4 is adjacent to the lattice points of the fourth layer LY4, at which no core is disposed. Thus, a higher mode light beam can be easily released from each of the core elements 10a and 10b disposed on the fourth layer LY4. Accordingly, the cutoff wavelengths of the cores can be prevented from being a long wavelength.

In all of the first cores 11a to 11c and the second core 21, the low refractive index layer is disposed on the cores adjacent to each other. Moreover, the effective refractive index difference between the core elements adjacent to each other or the effective refractive index difference between the core element and the second core 21 adjacent to each other is different. Accordingly, the crosstalk between the core elements adjacent to each other or the crosstalk between the core element and the second core 21 adjacent to each other can be reduced.

As described above, in accordance with the multicore fiber 1 according to the embodiment, the number of cores to be disposed can be increased, while reducing crosstalk and preventing a cutoff wavelength from being a long wavelength.

In the multicore fiber 1 according to the embodiment, the second core 21 is disposed on the apexes of a hexagon formed by connecting the lattice points adjacent to each other of the third layer LY3. Thus, any one of the core elements 10a to 10c is always located between the second cores 21, allowing the crosstalk between the second cores 21 having no low refractive index layer to be more appropriately reduced. All of the core elements 10a to 10c are adjacent to at least one lattice point, at which no core is disposed, and at least one second core 21. That is, all of the core elements 10a to 10c are adjacent to at least two lattice points, at which a higher mode light beam is easily released. Meanwhile, all of the second cores 21 are adjacent to one lattice point, at which no core is disposed, and surrounded by five core elements. That is, all of the second cores 21 are adjacent to only one lattice point, at which a higher mode light beam is easily released. When the influence of the adjacent core elements or the adjacent cores is ignored, a higher mode light beam is more easily released from the second core 21, which is not surrounded by the low refractive index layer, than from the core elements 10a to 10c having the low refractive index layers 13a to 13c. Accordingly, in accordance with the multicore fiber 1 according to the embodiment, the balance of the ease of releasing a higher mode light beam can be achieved between the core elements 10a to 10c and the second core 21.

In the multicore fiber 1 according to the embodiment, the lattice points of the fourth layer LY4, at which no core is disposed, are located at the apexes of a hexagon formed by connecting the lattice points adjacent to each other of the fourth layer LY4. No core is disposed on the apexes of the hexagon of the fourth layer LY4 as described above, allowing the outer diameter of the outer cladding 30 to be made smaller than in the case in which a core is disposed at these apexes.

Second Embodiment

Next, referring to FIG. 3, a second embodiment of the present invention will be described in detail. Note that, components the same as or equivalent to ones in the first embodiment are designated the same reference numerals and signs, and the overlapping description is omitted unless otherwise specified.

Figure 3:
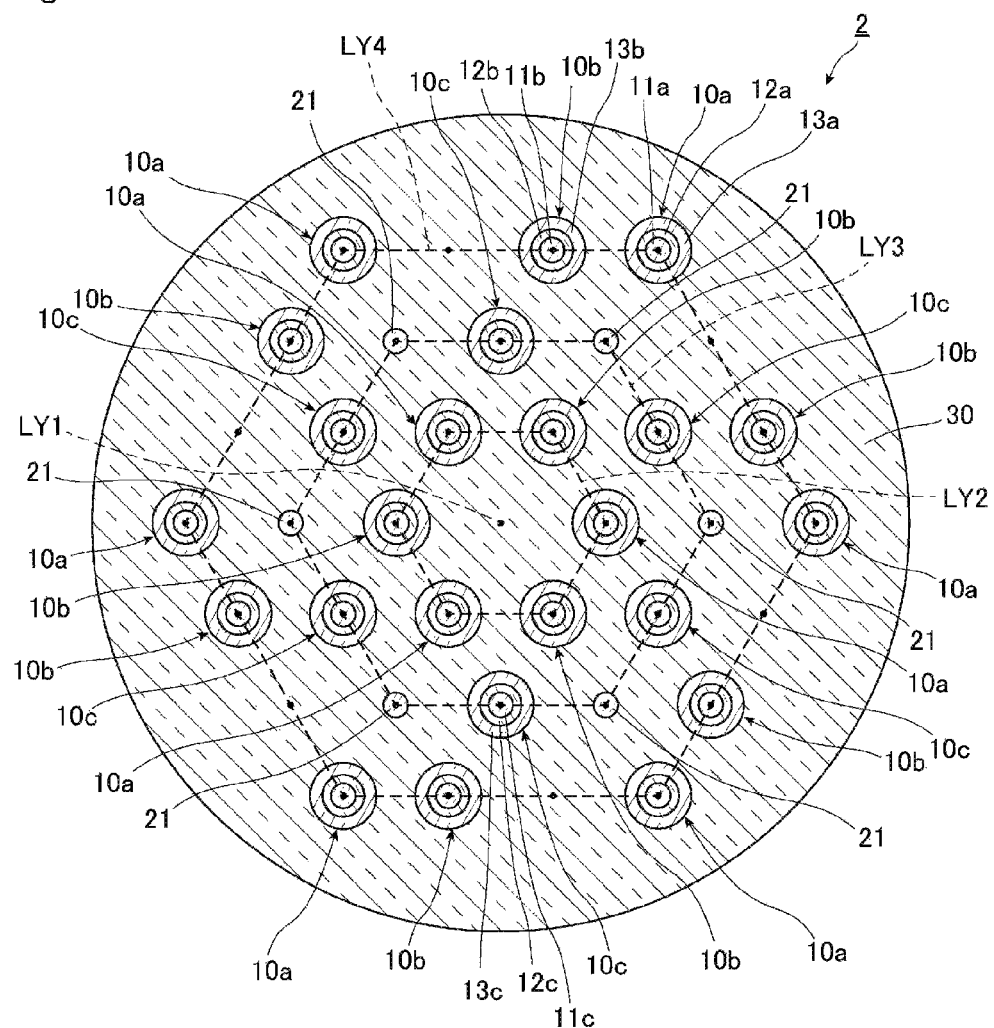
FIG. 3 is a cross sectional view of a multicore fiber according to a second embodiment of the present invention perpendicular to longitudinal direction.

FIG. 3 is a cross sectional view of a multicore fiber according to the embodiment perpendicular to longitudinal direction. As illustrated in FIG. 3, a multicore fiber 2 according to the embodiment is different from the multicore fiber 1 according to the first embodiment in that lattice points of a fourth layer LY4, at which no core is disposed, are located on the sides of a hexagon formed by connecting the lattice points adjacent to each other of the fourth layer LY4. Specifically, in the embodiment, a first core 11a of a core element 10a is located on the apexes of the hexagon of the fourth layer LY4.

According to the configuration of the multicore fiber 2 thus formed, a core element 10c disposed at the lattice point on the sides of a hexagon of a third layer LY3 is adjacent to the lattice point of the fourth layer LY4, at which no core is disposed. Thus, a higher mode light beam can be more easily released from the core elements 10c.

The core elements 10a and 10b are disposed on the fourth layer LY4 as in the embodiment, and the positions of the lattice points of the fourth layer LY4, at which no core is disposed, or the positions, at which the core elements 10a and 10b are disposed, are different at both ends of the multicore fiber 2. Accordingly, even in the case in which no markers to identify cores are provided, the type of the core can be identified.

Third Embodiment

Next, referring to FIG. 4, a third embodiment of the present invention will be described in detail. Note that, components the same as or equivalent to ones of the second embodiment are designated the same reference numerals and signs, and the overlapping description is omitted unless otherwise specified.

Figure 4:
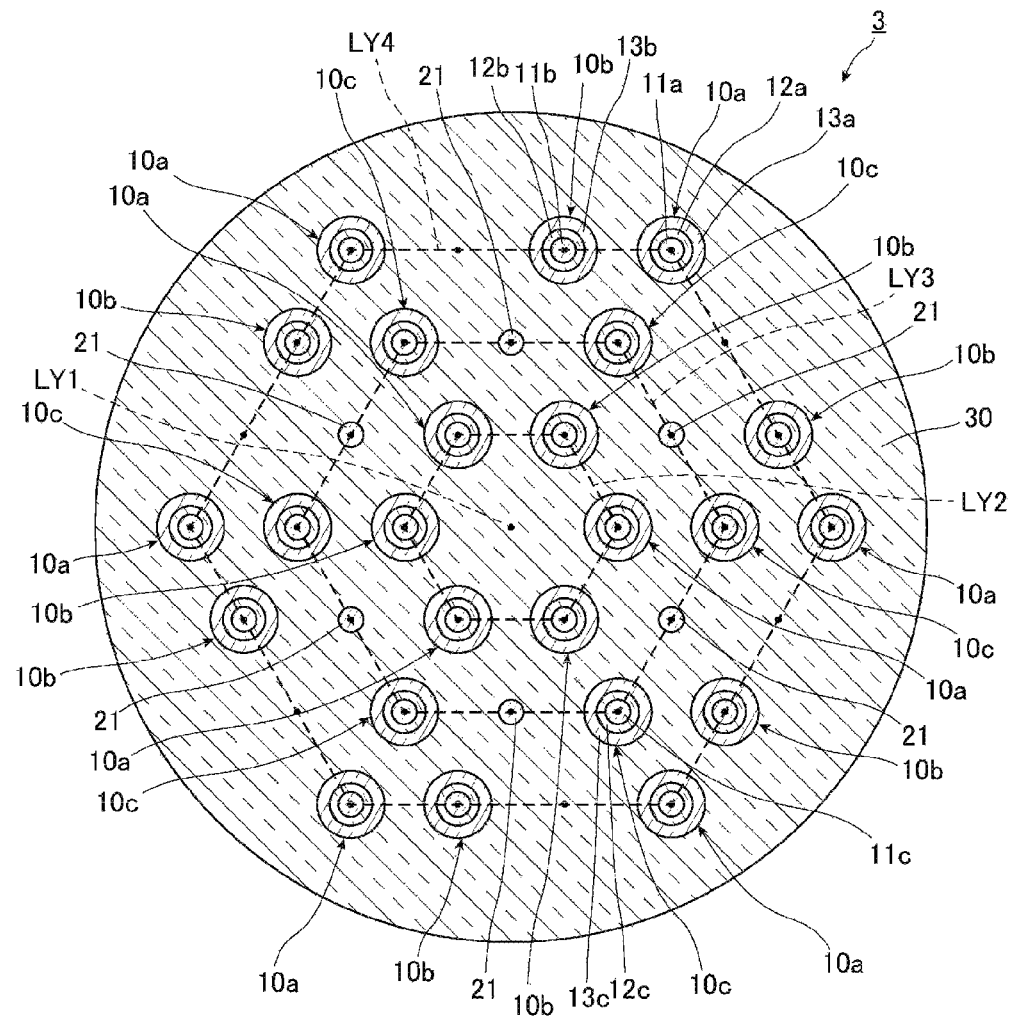
FIG. 4 is a cross sectional view of a multicore fiber according to a third embodiment of the present invention perpendicular to longitudinal direction.

FIG. 4 is a cross sectional view of a multicore fiber according to the embodiment perpendicular to longitudinal direction. As illustrated in FIG. 4, a multicore fiber 3 according to the embodiment is different from the multicore fiber 2 according to the second embodiment in that a second core 21 is disposed on the sides of a hexagon formed by connecting lattice points adjacent to each other of a third layer LY3.

The second core 21 is disposed as described above, and a core element 10c disposed on the third layer LY3 is disposed on the apexes of the hexagon of the third layer LY3.

In a similar manner to the multicore fiber 2 according to the second embodiment, even in the multicore fiber 3 according to the embodiment, the type of the core can be identified even in the case in which no markers to identify cores are provided.

As described above, the present invention is described as the embodiments are taken as examples. However, the present invention is not limited to these embodiments.

For example, in the foregoing embodiments, the core elements 10a to 10c are three types from the viewpoint of the refractive index. However, four types or more core elements may be used. For example, the core element 10a may be further sorted into two types of core elements whose effective refractive indexes are different from each other. Also in this case, however, the core elements 10a sorted into two types have their effective refractive indexes different from the effective refractive indexes of the core elements 10b and 10c and the second core 21. Similarly, the second core 21 may be two types or more cores whose effective refractive indexes are different from each other. Also in this case, the second cores 21 have their effective refractive indexes different from the effective refractive indexes of the core elements 10a to 10c.

In the foregoing embodiments, a configuration may be possible in which a fifth layer is assumed to be provided, and cores are disposed on the fifth layer. Even though the core elements are disposed on all the lattice shapes of the fifth layer, the core elements 10a and 10b on the fourth layer are adjacent to the lattice points, at which no core is disposed. Thus, a higher mode light beam can be easily released.

EXAMPLE

In the following, the content of the present invention will be described more in detail based on an example and a comparative example. However, the present invention is not limited to them.

Using the parameters described in Table 1, a multicore fiber 1 according to the first embodiment was prepared. Note that, the outer diameter of the outer cladding 30 was set to 228 μm, and the core pitch was set to 30 μm. Thus, the prepared multicore fiber 1 has the bending radius $R_{pk}$, in which the crosstalk reaches a peak, is 100 mm or less from Table 2 above.

Subsequently, the crosstalk of the prepared multicore fiber 1 was measured on a light beam at a wavelength of 1,550 nm, a light beam at a wavelength of 1,590 nm, and a light beam at a wavelength of 1,625 nm. Crosstalk in a cable length of 9.6 km was measured for 24 times, and the measured values were converted into values of crosstalk in a cable length of 100 km by a power coupling theory. Note that, in the measurement, the bending radius of the multicore fiber 1 was set to 155 mm.

Figure 5:
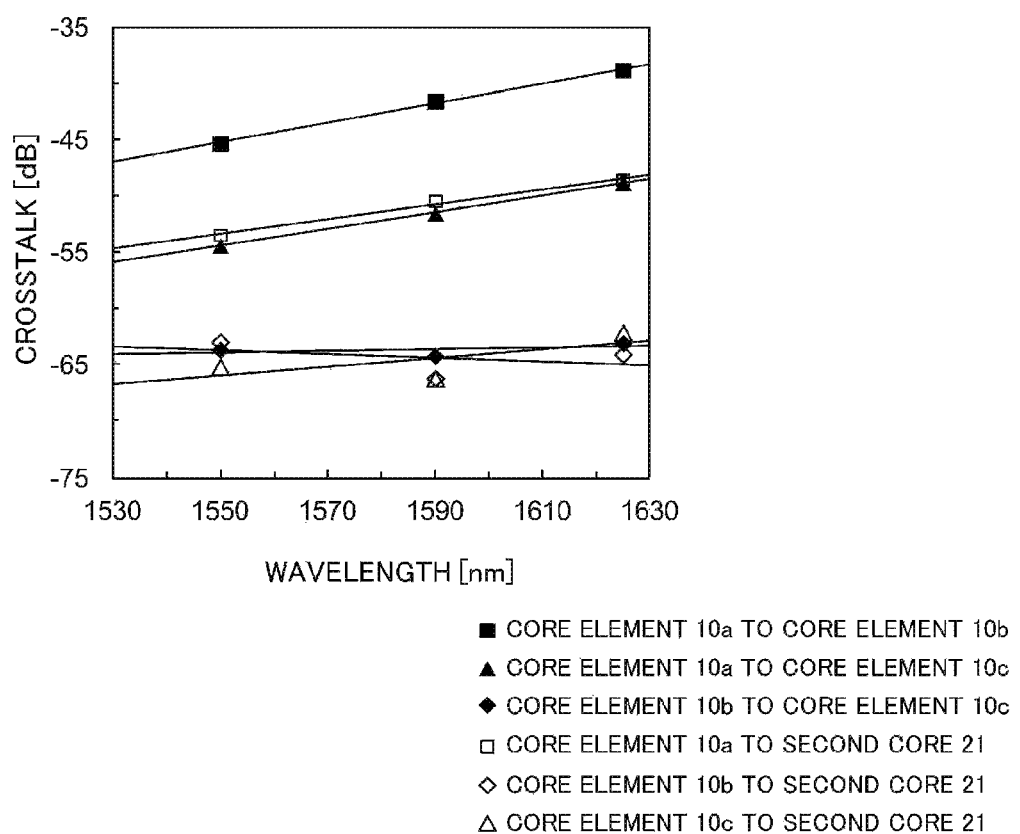
FIG. 5 is a diagram of measured results of crosstalk in an example.

The result is shown in Table 3 and FIG. 5. Note that, a solid line is an approximate straight line obtained by a method in which the average value of the crosstalk at each wavelength was calculated using a least square method.

TABLE 3

| | | Crosstalk[dB] | | |
|---|---|---|---|---|
| | | 1550 nm | 1590 nm | 1625 nm |
| Core element 10a to core element 10c ($\Delta n_{eff} = 0.0010$) | Average | −63.7 | −64.2 | −63.1 |
| | Maximum | −59.6 | −60.0 | −57.7 |
| | Minimum | −67.7 | −69.9 | −68.8 |

TABLE 3-continued

| | | Crosstalk[dB] | | |
|---|---|---|---|---|
| | | 1550 nm | 1590 nm | 1625 nm |
| Core element 10a to core element 10b ($\Delta n_{eff} = 0.0005$) | Average | −45.3 | −41.6 | −38.8 |
| | Maximum | −42.4 | −38.2 | −35.7 |
| | Minimum | −49.6 | −46.8 | −43.9 |
| Core element 10b to core element 10c ($\Delta n_{eff} = 0.0005$) | Average | −54.4 | −51.5 | −48.8 |
| | Maximum | −52.4 | −49.5 | −46.7 |
| | Minimum | −58.2 | −56.0 | −53.8 |
| Core element 10a to second core 21 ($\Delta n_{eff} = 0.0006$) | Average | −53.4 | −50.4 | −48.6 |
| | Maximum | −52.9 | −50.3 | −48.3 |
| | Minimum | −54.0 | −50.6 | −48.8 |
| Core element 10b to second core 21 ($\Delta n_{eff} = 0.0011$) | Average | −62.9 | −66.2 | −64.1 |
| | Maximum | −61.6 | −64.3 | −62.2 |
| | Minimum | −63.8 | −68.8 | −65.4 |
| Core element 10c to second core 21 ($\Delta n_{eff} = 0.0016$) | Average | −65.2 | −66.2 | −62.1 |
| | Maximum | −60.5 | −64.3 | −61.4 |
| | Minimum | −68.8 | −68.1 | −63.3 |

From Table 3 and FIG. 6, in a cable length of 100 km, in light beams at wavelengths from 1,530 nm to 1,625 nm (in the C band to the L band), crosstalk was smaller than −37 dB, which was a small crosstalk practically causing no problem.

From the example, the multicore fiber according to the present invention demonstrated that crosstalk can be reduced.

As described above, according to the present invention, there is provided a multicore fiber that can increase the number of cores to be disposed, while reducing crosstalk and preventing a cutoff wavelength from being a long wavelength.

REFERENCE SIGNS LIST 1, 2, 3 . . . multicore fiber
10a, 10b, and 10c . . . core element
11a, 11b, 11c . . . first core
12a, 12b, 12c . . . inner cladding
13a, 13b, 13c . . . low refractive index layer
21 . . . second core
30 . . . outer cladding
LY1 . . . first layer
LY2 . . . second layer
LY3 . . . third layer
LY4 . . . fourth layer

The invention claimed is:
1. A multicore fiber comprising:
a plurality of core elements having
a first core,
an inner cladding surrounding an outer circumferential surface of the first core, and
a low refractive index layer having a refractive index lower than a refractive index of the inner cladding, the low refractive index layer surrounding the inner cladding;
a plurality of second cores; and
an outer cladding having a refractive index lower than a refractive index of the first core and a refractive index of the second core and higher than the refractive index of the low refractive index layer, the outer cladding surrounding the core elements and the second cores,
wherein:
an effective refractive index of the core element is different from an effective refractive index of the second core;

the plurality of core elements is enabled to be sorted into at least three types of core elements whose effective refractive indexes are different from each other; and in a triangular lattice based on apexes of a regular hexagon surrounding a center of the outer cladding, when a lattice point surrounded by the apexes is a first layer, a layer formed of lattice points located on the apexes is a second layer, a layer formed of lattice points disposed adjacently around an outer side of the second layer is a third layer, and a layer formed of lattice points disposed adjacently around an outer side of the third layer is a fourth layer, no core is disposed at the lattice point of the first layer, the first core of the core element is disposed at the lattice points of the second layer, the first core of the core element and the second core are alternately disposed at the lattice points of the third layer, in the fourth layer, no core is disposed at six lattice points, and the first core of the core element is disposed at the other lattice points, the second cores are adjacent to the lattice points of the fourth layer, at which no core is disposed, and effective refractive indexes of the core elements adjacent to each other are different from each other.

2. The multicore fiber according to claim 1, wherein the second core is disposed on apexes of a hexagon of the third layer formed by connecting lattice points adjacent to each other.

3. The multicore fiber according to claim 2, wherein the lattice points of the fourth layer, at which no core is disposed, are located on apexes of a hexagon of the fourth layer formed by connecting lattice points adjacent to each other.

4. The multicore fiber according to claim 2, wherein the lattice points of the fourth layer, at which no core is disposed, are located on sides of a hexagon of the fourth layer formed by connecting lattice points adjacent to each other.

5. The multicore fiber according to claim 1, wherein the second core is disposed on sides of a hexagon of the third layer formed by connecting lattice points adjacent to each other.

6. The multicore fiber according to claim 1, wherein:

an outer diameter of the outer cladding is 230 μm or less; and a distance from the lattice point to the lattice point is 30 μm or less.

7. The multicore fiber according to claim 1, wherein a level of crosstalk between the core elements adjacent to each other and a level of crosstalk between the core element and the second core adjacent to each other reach a peak at a bending radius smaller than a radius of 100 mm.

8. The multicore fiber according to claim 1, wherein when a light beam at a wavelength of 1,550 nm propagates through the core element and the second core, a level of crosstalk between the core elements adjacent to each other and a level of crosstalk between the core element and the second core adjacent to each other are −37 dB or less per 100 km.

9. The multicore fiber according to claim 1, wherein the core element and the second core transmit a light beam at a wavelength of 1,530 nm or more in a single mode.

10. The multicore fiber according to claim 1, wherein an effective refractive index difference between the core elements adjacent to each other and an effective refractive index difference between the core element and the second core adjacent to each other are 0.0005 or more.

11. The multicore fiber according to claim 1, wherein an effective cross sectional area of the core element and an effective cross sectional area of the second core are equal.

\* \* \* \* \*